United States Patent
Hidrot et al.

(10) Patent No.: US 9,440,496 B2
(45) Date of Patent: Sep. 13, 2016

(54) TREAD FOR HEAVY GOODS VEHICLE TIRE

(75) Inventors: Jean-Denis Hidrot, Clermont-Ferrand (FR); Stéphanie Cambon, Clermont-Ferrand (FR); Richard Audigier, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 526 days.

(21) Appl. No.: 14/008,374

(22) PCT Filed: Mar. 30, 2012

(86) PCT No.: PCT/EP2012/055905
§ 371 (c)(1),
(2), (4) Date: Jan. 9, 2014

(87) PCT Pub. No.: WO2012/131081
PCT Pub. Date: Oct. 4, 2012

(65) Prior Publication Data
US 2014/0110025 A1   Apr. 24, 2014

(30) Foreign Application Priority Data

Apr. 1, 2011  (FR) ...................................... 11 52829

(51) Int. Cl.
*B60C 11/03* (2006.01)
*B60C 1/00* (2006.01)
(Continued)

(52) U.S. Cl.
CPC ......... *B60C 11/0323* (2013.04); *B60C 1/0016* (2013.04); *B60C 11/005* (2013.01);
(Continued)

(58) Field of Classification Search
CPC .......................... B60C 11/24; B60C 11/0323
USPC .......................................... 152/154.2, 209.18
See application file for complete search history.

(56) References Cited

U.S. PATENT DOCUMENTS 7,249,620 B2 *  7/2007  Croissant ............ B60C 11/0302
                                                            152/154.2
7,306,019 B2 * 12/2007  Kurokawa ............. B29D 30/52
                                                            152/209.17
(Continued)

FOREIGN PATENT DOCUMENTS

FR    1 375 849 A    10/1964
FR    2 940 185 A1    6/2010
(Continued)

OTHER PUBLICATIONS

International Search Report (PCT/ISA/210) mailed on May 16, 2012, by the European Patent Office as the International Searching Authority for International Application No. PCT/EP2012/055905.

*Primary Examiner* — Timothy Kennedy
(74) *Attorney, Agent, or Firm* — Dickinson Wright PLLC

(57) ABSTRACT

Tread for a tire for a heavy goods vehicle of total thickness E and of total volume V, having at least one continuous groove comprising: at least two wearing layers in the thickness of the tread, each having a thickness at most equal to 75% of the total thickness E of the tread, a plurality of external cavities and a plurality of internal cavities positioned radially and entirely on the inside of the tread surface in the new state, each internal cavity being connected to an external cavity by a connecting channel, and having a total voids volume Vc at least equal to 7% and at most equal to 12% of a volume equal to the sum of the total volume V and of the total voids volume, and having an effective voids volume Ve for each wearing layer less than the total voids volume Vc, and satisfying the equation: $0.4\, St < Ve < 0.8\, St$, wherein 0.4 and 0.8 are heights in millimeters and St is the surface delimited by the external contour of the contact patch under static conditions under service load and pressure, and at least the first wearing layer I is made up of a rubber compound based on at least one material having a dynamic Tg higher than −40° C. and predominantly containing a SBR copolymer of Tg>−65° C.

11 Claims, 2 Drawing Sheets

Coupe selon IV-IV

(51) Int. Cl.
*B60C 11/04* (2006.01)
*B60C 11/12* (2006.01)
*B60C 11/00* (2006.01)

(52) U.S. Cl.
CPC .......... *B60C11/032* (2013.04); *B60C 11/0309* (2013.04); *B60C 11/042* (2013.04); *B60C 11/12* (2013.01); *B60C 11/1281* (2013.04); *B60C 2011/0025* (2013.04); *B60C 2200/06* (2013.04)

(56) References Cited

U.S. PATENT DOCUMENTS

2005/0081972 A1* 4/2005 Lopez ................ B29D 30/0606
                                                      152/209.17
2005/0209413 A1   9/2005 Labauze et al.
2006/0090827 A1* 5/2006 Merino Lopez ........ B60C 11/01
                                                      152/209.16
2007/0251621 A1* 11/2007 Prost ...................... B60C 23/20
                                                      152/154.2
2011/0263750 A1  10/2011 Lopitaux et al.
2011/0277898 A1  11/2011 Barraud et al.
2012/0227883 A1*  9/2012 Audigier ............ B60C 11/0309
                                                      152/209.18

FOREIGN PATENT DOCUMENTS

WO    WO 02/38399 A2       5/2002
WO    WO 2010/000443 A1    1/2010
WO    WO 2010/030276 A1    3/2010

* cited by examiner

Coupe selon II-II

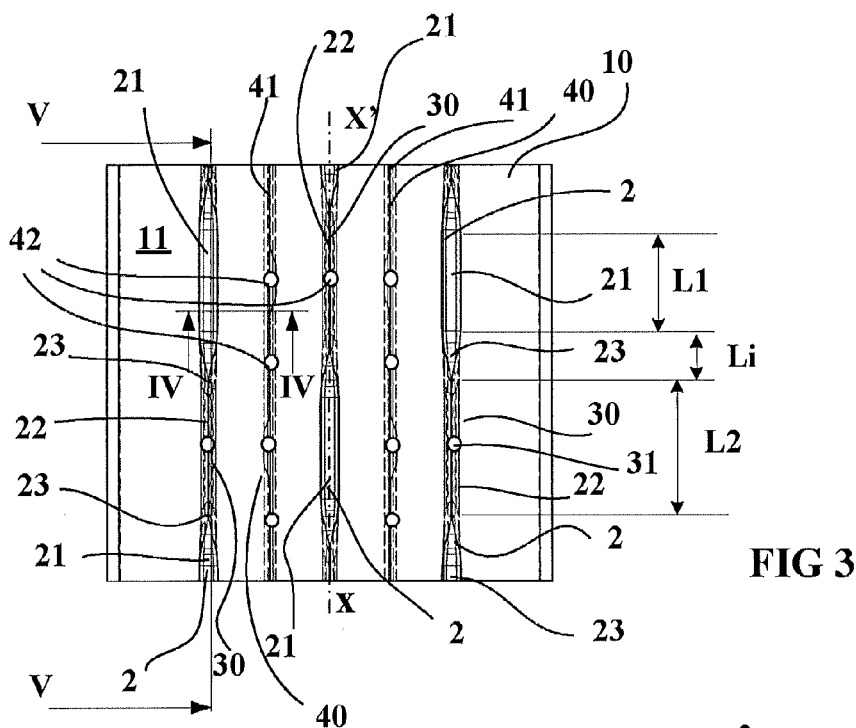
FIG 3
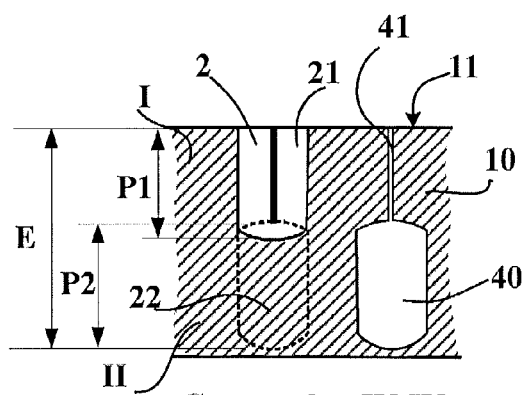
Coupe selon IV-IV
FIG. 4
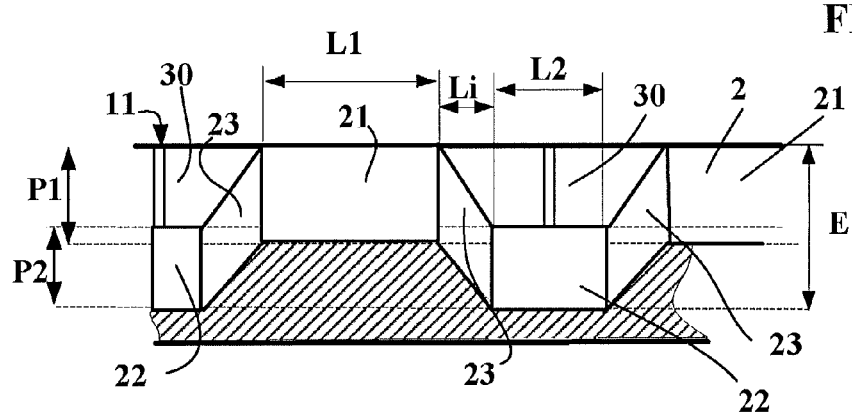
Coupe selon V-V   FIG 5

TREAD FOR HEAVY GOODS VEHICLE TIRE

BACKGROUND

1. Field

The present invention relates to treads for tires fitted to heavy goods vehicles and, more particularly, relates to the tread pattern of these treads and to the rubber compounds of which they are made.

2. Description of Related Art

Wet weather driving requires the most rapid possible removal of the water in the contact patch where each tire makes contact with the roadway so as to ensure that the material of which the tread is made makes contact with this roadway. To achieve this, grooves are formed on the tread which, through their dimensions (depth and width), remain open in the contact patch with the roadway and thus allowing water that is not pushed around the front and sides of the tire to be drained away.

The grooves may have any shape in cross section and in terms of the line they follow along the tread surface and may be orientated in any direction. The line followed by a groove on the tread surface here mean the mean geometric line followed by the edge corners formed by said groove on said surface.

For the tires intended for the steered or load-bearing axles of a heavy goods vehicle, it is usual practice to provide the tread of these tires with longitudinal grooves the depth of which is equal substantially to the total thickness of the tread (not including any thickness that may be provided in order to allow the grooves to be partially renewed). This depth as a general rule is comprised between 13 and 18 mm on these axles. For the tires intended for the driven axles, the groove depth may be as much as 24 mm.

For such tires of the prior art, the total voids volume content is, as a general rule, comprised between 15 and 25% of the volume of the tread intended to be worn away during driving. It is found that these tires have an available voids volume in the contact patch that is relatively large in the new state; this voids volume opening onto the tread surface in the contact patch is, on average, of the order of 100 $cm^3$ for example for a tire of size 315/70 R 22.5. For the tire in question, this value is obtained for its nominal inflation and static load conditions as defined by the ETRTO standard.

Moreover, in order to improve the grip of the tire on the roadway, it is known practice to form sipes which generate edge corners on the tread surface. A sipe is a thin slit of small mean width and such that, under the usual loading conditions, the walls of material that delimit this sipe can at least partially come into contact with one another when passing through the contact patch where the tire is in contact with the road so as to limit the loss of stiffness. These sipes may be the depth equal to the thickness of the tread to be worn down or less than this thickness.

While grooves or more generally cavities are essential to draining water away, the resulting reduction in surface area may have appreciable effect on the wear performance of a tread and therefore reduce the service life of the tire as a result of an increase in wear rate. Other performance aspects of the tire may also be affected, notably performance regarding behaviour, road noise while driving, rolling resistance. It has also been found that these grooves formed to have a working depth equal to the height of tread to be worn away may cause endurance problems. Under certain driving conditions, foreign objects such as stones may become lodged in these grooves and attack the bottom of these grooves causing cracks to appear in the rubber.

Moreover, the grooves lead to a drop in the compression stiffness and shear stiffness because these grooves delimit portions of material which are more sensitive to deformation in comparison with the portions delimited by sipes. This is because, in the case of sipes, the walls of material delimiting these sipes can come into contact with one another at least when passing through the contact patch with the roadway. This reduction in stiffness, in the case of the presence of the grooves, leads to an increase in deformations and generates a reduction in tread wear performance: greater wear is noted for a set distance traveled (which corresponds to an increase in the tread wear rate). Moreover, an increase in rolling resistance and therefore in fuel consumption of vehicles fitted with such tires is also noted, this being the result of an increase in hysteresis losses associated with the deformation cycles of the material of which the tread is made.

The material from which to make the tread is generally chosen as a function of the use to which the tire is put: conventionally, the use of natural rubber makes it possible to obtain both a low level of hysteresis (therefore a low tire heating) and a very good resistance to attack and chunking. This is why materials based on natural rubber are usually employed in forming tire treads for heavy goods vehicles. The use of non-isoprene diene elastomers such as SBR copolymers of Tg higher than the Tg of natural rubber makes it possible to improve grip on wet surfaces. However, this is achieved at the expense of hysteresis and therefore of rolling resistance; this is why it is preferable to use functionalized SBRs which make it possible to maintain hysteresis levels compatible with the use in a tread for a heavy goods vehicle tire. However, the use of this type of elastomer, although accompanied by a marked improvement in wet grip, leads to a reduction in the resistance to chunking on impact, and notably when the impacts are to the lateral parts of the treads when driving up against obstacles.

DEFINITIONS

A tread pattern in this description means the geometry of that part of the tread that is intended to come into contact with a roadway, this tread pattern being formed by raised elements delimited from one another by cuts (grooves, Sipes, wells, cavities).

The total volume of a tread is equal to the total volume of material that can be worn away while driving before the tire has to be removed either so that its tread can be renewed by retreading, or so that it can be replaced by a new tire.

The total voids (or cavities) volume of a tread is equal to the sum of all the voids volumes whether or not they open onto the tread surface in the new state. Voids here means grooves, wells or any type of cavities, said cavities being intended to open into the roadway contact patch and contribute, at some time or another, to draining the contact patch.

A block is a raised element formed on the tread and is delimited by voids or grooves and comprising lateral walls and a contact face intended to come into contact with the roadway during driving.

The equatorial median plane is a plane perpendicular to the axis of rotation of the tire and passing through those points on the tire which are radially the furthest from said axis of rotation. This equatorial plane more or less divides the tire into two substantially equal halves.

A radial direction means a direction perpendicular to the axis of rotation of the tire (this direction corresponds to the direction of the thickness of the tread).

An axial direction means a direction parallel to the axis of rotation of the tire.

The circumferential direction means a direction perpendicular both to the axial direction and to a radial direction.

The usual driving conditions or service conditions of the tire are those defined by the E.T.R.T.O. standard; these service conditions specify the reference inflation pressure corresponding to the load bearing capability of the tire as indicated by its load rating and speed code. These service conditions may also be referred to as the "nominal conditions" or "conditions of use".

In the present description, unless expressly indicated otherwise, all the percentages (%) indicated are percentages (%) by weight.

"phr" means parts per hundred elastomers.

Any range of values denoted by the expression: "between A and B" represents all values higher than A and lower than B (the values A and B are excluded from this set), whereas any range of values designated by the expression "from A to B" represents the set of all values at least equal to A and at most equal to B (the values A and B are included in this set).

In the usual way, the present text uses the terms "elastomer" and "rubber" arbitrarily and interchangeably.

SUMMARY

The present invention seeks to offer a tread for a tire intended to be fitted to a heavy goods vehicle and which, through a sensible combination of a material that offers improved wet grip performance and a special type of tread pattern makes it possible to achieve a good performance compromise and notably good impact resistance.

To this effect, one subject of the invention is a tire for a tread of a heavy goods vehicle of total thickness E and total volume V, this tread having a tread surface intended to come into contact with a roadway and furthermore having:
  at least two wearing layers I, II in the thickness of the tread, each layer having a thickness at most equal to 75% of the total thickness E of the tread,
  a total voids volume Vc at least equal to 7% and at most equal to 12% of a volume equal to the sum of the total volume V of the tread and of the total voids volume,
  at least one continuous groove comprising a plurality of external cavities opening onto the tread surface in the new state and a plurality of internal cavities positioned radially and entirely on the inside of the tread surface in the new state, the first wearing layer extending into the thickness of the tread as far as the radially innermost points of the external cavities, each other wearing layer extending into the depth of the tread as far as the innermost points of the internal cavities of the wearing layer in question, the external cavities having a mean depth P1 at most equal to 75% of the total thickness E of the tread, a mean length L1 and a cross section of area S1, the internal cavities having a mean height P2 at most equal to 75% of the thickness of the tread, a mean length L2 and a cross section of area S2, each internal cavity being connected to an external cavity by a connecting channel having two ends, said ends having cross sections of areas equal to the areas S1, S2 of the cross sections of the internal and external cavities connected by this connecting channel,
  this tread furthermore having an effective voids volume Ve for each wearing layer, this effective voids volume Ve contributing to draining the contact patch in which the tread is in contact with a roadway, which is less than the total voids volume Vc of the tread, this effective voids volume satisfying the following equation:

$$0.4 St < Ve < 0.8 St,$$

in which 0.4 and 0.8 are heights expressed in millimeters and St is the surface delimited by the external contour of the contact patch of the tire measured under static conditions under nominal load and pressure, the tire being mounted on its recommended rim.

This tread is also such that at least the first wearing layer I is made up of a rubber compound based on at least one material having a dynamic Tg—measured in accordance with standard ASTM D 5992-96, higher than −40° C. and predominantly containing a SBR copolymer of Tg>−65° C.

For preference, the rubber compound based predominantly on SBR is chosen so that it has an elongation at break at 60° C. of less than 500%. More preferably still, this elongation is lower than 400%.

This elongation at break is preferably measured on a sample of material taken from the vulcanized tire. In this method (referred to as "method 2") a test specimen is formed from each sample taken so as to have a length of 18 mm, a width of 1.1 mm and a thickness of 0.3 mm. The test specimen from the tire is sampled in such a way that its length runs perpendicular to the circumferential direction of the tire. This test specimen is then stretched on an extensometer at a rate of 50 mm/min at a temperature of 60° C. until it breaks. The deformation at break is logged, by monitoring the displacement of the crossbeam and the stress at breakage on at least two test specimens.

Another method (referred to as "method 1") is to measure this elongation at break under conditions as defined by French standard NF T 40-101(December 1979). In this method, the elongation at break is obtained in a uniaxial tensile test. The measurement is taken by stretching to breaking point and at a rate of 500 mm/min an "H2" test specimen 2.5 mm thick. The deformation is monitored using a "Zwick" (trade name) optical extensometer, measurements being taken at 60° C.

By virtue of this combination of tire tread pattern and of a material as chosen, it is possible to obtain improved wet grip performance. This is because, and despite the reduction in performance of the chosen material in terms of breakage properties as compared with the materials used in the prior art—such conventional materials being predominantly based on natural rubber, it is possible, by virtue of the combination of this tread pattern and this specific material, to obtain both good wear and driving performance while at the same time having satisfactory performance in terms of impact resistance and notably resistance to breakage at the bottom of the grooves.

Remember that the conventional compounds are based predominantly on natural rubber cut with SBR copolymers of Tg comprised between −108° C. (BR) and −48° C. (SBR). This cutting means that the dynamic Tg of the material is somewhere between −55° C. and −45° C. The solution used in the present invention contains a majority of SBR of Tg higher than −65° C. (this value corresponding to the Tg of natural rubber).

An effective voids volume Ve for each wearing layer here means a voids volume formed in the tread to serve to drain the contact patch of the trend, this effective voids volume being determined when the tire is subjected to standard conditions of use.

A wearing layer in the present application means a part of the tread associated with the maximum depth of grooves in said wearing layer. A wearing layer has a thickness less than the total thickness of the tread and equal to the maximum depth of the grooves or cavities present in this wearing layer. The treads of the invention comprise at least two wearing layers some of the grooves or cavities of which are formed in only one of said layers. It is of course possible and even advantageous in this configuration for each wearing layer to become active before a previous wearing layer has completely worn away; in such an instance, there is an overlap between at least two wearing layers. A wearing layer becomes active once the cavities or grooves formed in this layer open onto the tread surface of the tire in contact with the roadway to drain away the water present on said roadway in wet weather. The first wearing layer corresponds to the part of the tread that is radially furthest towards the outside in the new state.

The heights of 0.4 mm and 0.8 mm correspond to mean heights of water that may be present on a roadway in wet weather and that needs to be able to be drained away or collected in order to maintain good contact between the tread and the roadway. These mean heights, multiplied by the surface area Se—of the surface area determined by the contour of the contact patch in which the tread is in contact with that same roadway and expressed in $mm^2$ (the surface areas corresponding to the cavities opening onto the tread surface are taken into consideration here)—give an indication of the effective voids volume Ve when the tire is subjected to its nominal conditions of use (internal inflation pressure and load borne). If this volume Ve is less than 0.4 times Se, then it is not enough to obtain sufficient drainage and water then remains at the interface between the tire and the roadway. If this volume Ve is greater than 0.8 times Se then this volume is deemed to be excessive from a standpoint of achieving suitable tread stiffness.

For preference, the tread according to the invention is such that all its wearing layers are made of one and the same rubber compound.

According to a preferred alternative form, the external and internal cavities of the continuous grooves are such that the difference between the mean lengths of the internal cavities and of the external cavities is at most equal to 20% of the longest mean length (namely 0.80≤L1/L2≤1.20), the difference in the mean cross-sectional areas of the internal and external cavities is at most equal to 20% of the largest mean area (namely 0.80 S1/S2≤1.20), and each external cavity is connected to at least two internal cavities of the same groove by connecting channels which provide the continuity between said internal and external cavities. These connecting channels have the function of allowing water to flow between the external cavities that pick up the water and the internal cavities.

According to another preferred variant, this tread further comprises a plurality of sipes opening onto the tread surface in the new state, each of said sipes connecting two consecutive external cavities of one same groove and at least two connecting channels and at least one internal cavity. These sipes are present to make the tread easier to mould and to release from the mould.

According to a preferred variant of the present invention, for each continuous groove comprising a plurality of external cavities opening onto the tread surface in the new state and a plurality of internal cavities positioned radially and entirely on the inside of the tread surface in the new state, the total volume of the internal cavities is at least equal to 30% and at most equal to 60% of the total volume of said groove in the new state.

In order to ensure lasting wear performance, it is sensible for the necessary voids volumes to be formed within each wearing layer either by forming cavities or by forming grooves. Grooves differ from cavities in that they open towards the outside of the contact patch of the tire to allow water present on the roadway in wet weather to be removed. It is thus advantageous to form a kind of network of grooves which, regardless of the degree of tread wear according to the invention, allows flow away from the contact patch, this network being formed in such a way as to limit the reduction in stiffness associated with the formation of partial voids in the tread.

Advantageously, the rubber compound of at least the first wearing layer contains silica by way of reinforcing filler.

More advantageously still, the SBR copolymer of the rubber compound is functionalized with regard to the silica.

According to another interesting variant of tread according to the invention, all the wearing layers of this tread have the same composition.

The invention extends to any tread that is manufactured with a view to renewing the external part of a tire following wear by retreading or alternatively to any type of tire intended to be fitted to a heavy goods vehicle and provided with a tread as described hereinabove.

Other features and advantages of the invention are apparent from the description given hereinafter with reference to the attached drawings which, by way of nonlimiting example, show one embodiment of the subject matter of the invention.

BRIEF DESCRIPTION OF THE FIGURES

FIG. 3 shows a plan view of a tread according to the invention;

FIG. 4 shows a view in section of the tread of FIG. 3 sectioned on a line IV-IV;

FIG. 5 shows a partial view of the tread shown in FIG. 3.

DETAILED DESCRIPTION OF SPECIFIC EMBODIMENTS

Figure 1:
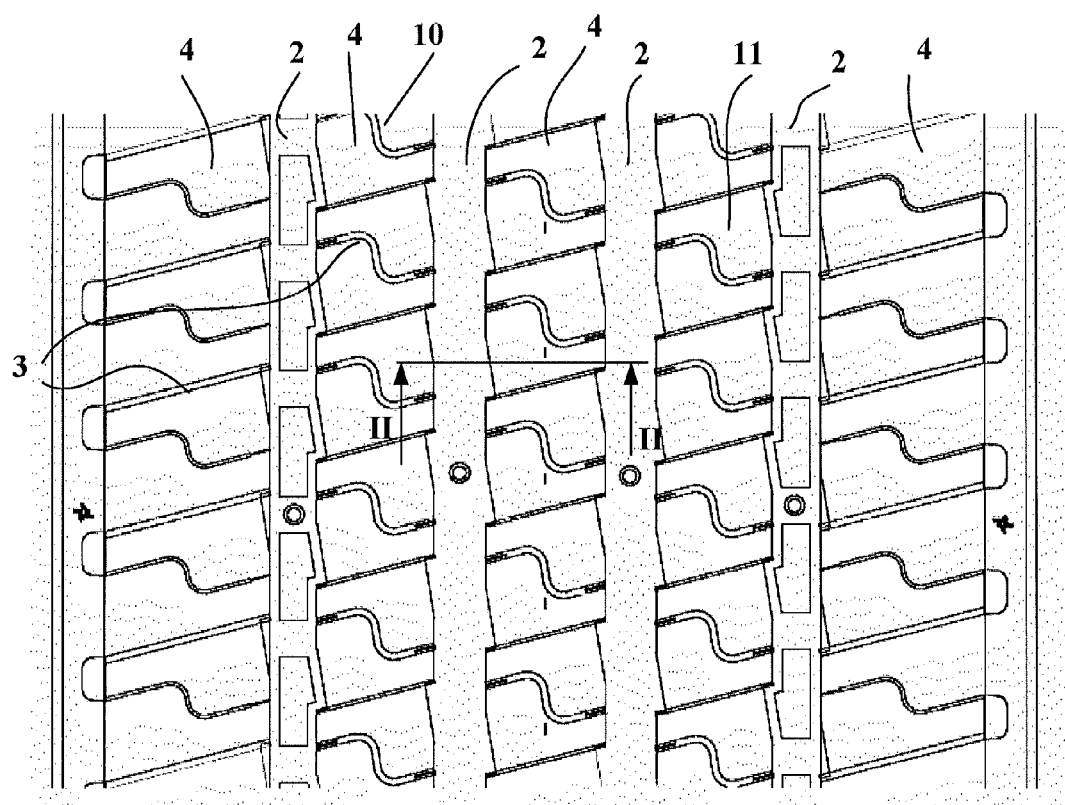
FIG. 1 depicts a plan view of a tread according to the prior art.

FIG. 1 shows a plan view of a tread 10 according to the prior art corresponding to the tread pattern XZE2 as marketed for the 315/70 R 22.5 size.

The tread pattern design of this tread 10 is denoted S0; in what follows, this tread pattern S0 is considered as reference tread pattern.

For the tire in question, this reference tread pattern S0 comprises four longitudinal grooves 2, of which the depth, equal to 15 mm, corresponds to the total thickness E of the tread intended to be worn away during driving. This same reference tread pattern S0 also comprises transverse grooves 3 of narrow width and shallow depth (at most equal to 2 mm). The longitudinal grooves delimit ribs 4.

In the initial state corresponding to the tread in the new and unworn state, this reference tread pattern S0 has a total voids volume, measured under nominal inflation pressure and load conditions, available in the contact patch which is large and in this instance equal to 100 $cm^3$. This volume is measured under the following static conditions: loading equal to 3250 kg and inflation pressure equal to 9 bar.

Figure 2:
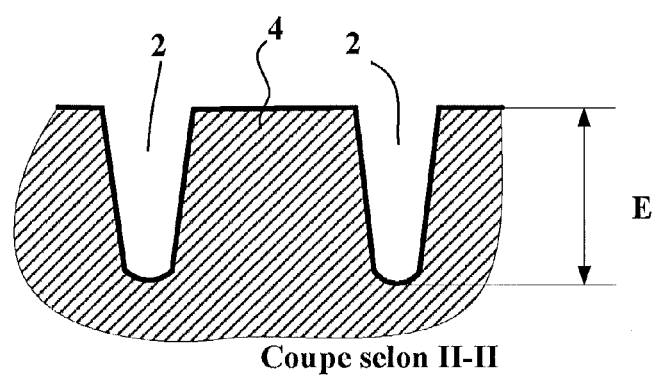
FIG. 2 shows a view in local section of the tread of FIG. 1 sectioned on a line II-II.

FIG. 2 shows a view in cross section following a line II-II of the tread of FIG. 1. This FIG. 2 shows that the longitudinal grooves 2 delimit ribs 4 of a height equal to the depth of the longitudinal grooves, this depth coinciding with the thickness E of tread to be worn away.

In this particular instance, there is just one wearing layer because the total voids volume formed by the longitudinal grooves is completely open on the tread surface in the initial state (when the tire is new) and this voids volume decreases as the tread gradually wears away.

This reference tread pattern S0 has a total voids volume equal to 19% of the total volume of tread designed to be worn away.

All the grooves have depths equal to the thickness of the tread.

This reference tread pattern S0 has an effective voids volume Ve which is higher than the volume obtained by multiplying a height of 1 mm by the surface area St (in $mm^2$) corresponding to the surface delimited by the external contour of the contact patch of the tread measured under static conditions under nominal load and pressure.

For this reference tread pattern S0, the effective voids volume Ve for draining away water in the contact patch in the single wearing layer is equal to 100% of the total voids volume Vt of the tread, because all the voids open onto the tread surface of the new tire.

FIG. 3 shows a plan view of a tread pattern S1 of a tread which, in combination with a compound containing a non-isoprene synthetic diene elastomer at a content of 40 phr or higher, and, by way of predominant (in terms of weight) reinforcing filler, contains at least one carbon black, falls within the scope of the present invention.

This tread is intended for a tire of size 315/70 R 22.5 itself intended to be fitted to the steered axle of a heavy goods vehicle.

This FIG. 3 shows part of a tread 10 in the new state, this tread 10 having a tread surface 11 intended to come into contact with the roadway during driving. This tread 10 comprises three grooves 2 which in the new state are continuous in the circumferential direction. Each groove 2 is formed from a succession of a plurality of external cavities 21 of elongate shape of length L1 opening onto the tread surface 11 in the new state, and of a plurality of internal cavities 22 of length L2 situated entirely on the inside of the tread in the new state. The connecting channels 23 are formed to connect together the internal cavities 22 and the external cavities 21 and thus provide continuity of the groove 2 in the main direction of this groove. These connecting channels 23 have, when measured in the main direction of the groove (in this instance in the circumferential direction), a non-zero length Li which in this instance is less than the lengths L1 and L2. It is as if the groove 2 was following a wavy line in the radial direction, this groove comprising a succession of parts (external cavities) opening onto the tread surface in the new state, alternating with parts (internal cavities) that are entirely on the inside of the tread in the new state, the connecting cavities providing continuity between the volumes of said internal and external cavities (i.e. providing the possibility of a fluid flowing from the outside towards the inside and vice versa. Thus, water present on the roadway can be drained by the external cavities towards the internal cavities as they come into contact with this roadway. Of course, there always has to be at least one external cavity completely or partially open in the contact patch in which the tire is in contact with the roadway. The dimensions of the external cavities and those of the internal cavities are determined so that this condition is met for a given length in contact with a roadway.

The depth of the external cavities 21 determines more or less the thickness of the first wearing layer I, visible in FIG. 4 and described later on.

To allow these grooves to be released from the mould, sipes 30 extend the internal cavities 22 radially outwards. These sipes 30 are provided with wells 31 oriented radially outwards, said wells opening both onto the tread surface in the new state and into the internal cavities 22.

Interposed between these longitudinal grooves 2, the tread 10 is provided with channels 40 which run longitudinally and are formed wholly on the inside of the tread 10. These channels 40 are intended to become visible at the surface (which means to open onto the tread surface) following a degree of wear corresponding substantially to the wearing away of the first wearing layer I (preferably slightly before the first layer is fully worn away). These channels 40 are extended towards the tread surface by a sipe 41 connecting a plurality of wells 42, these wells opening both onto the tread surface 11 and into the channel 40. These wells together with the external cavities 21 contribute to draining the contact patch during driving.

FIG. 4 shows a section of the tread in a plane of section identified by the line IV-IV in FIG. 3.

This FIG. 4 shows, in section, the tread 10 of thickness E and the cross section of a groove 2 showing an external cavity 21 of area S1 and extending into the tread over a depth P1 equal to 7 mm, is approximately 64% of the total thickness E of the tread (here equal to 11 mm). This external cavity 21 is extended radially outwards by a sipe 30 and is connected to internal cavities 22 of area S2 which, via their height P2, determine a second wearing layer II. This second wearing layer II is intended to become apparent shortly before the first wearing layer 1 has been completely worn away. This FIG. 4 also shows an entire duct 40 situated in the second wearing layer, itself extended radially outwards by the sipe 41. This channel has a cross-sectional area substantially equal to the area S2 of the internal cavity 22.

With each groove 2, it is as if each wearing layer has different cavities on the tread surface. A first wearing layer reveals the external cavities 21 on the tread surface and a second layer II reveals the internal cavities 22 and the channels 40 on a new tread surface. The wearing layer I ends in the thickness of the tread at the bottom of the external cavities and this wearing layer is not yet completely worn away when the wearing layer II already becomes apparent (as soon as the internal cavities 22 appear on the tread surface). Thus, at any moment, the tread comprises a voids volume suited to achieving drainage of any water that might be present on the roadway.

Before the internal cavities 22 become apparent, the connecting channels 23 continue to perform their function and notably to provide continuity between the voids volumes formed by the external cavities and the internal cavities of the groove 2.

FIG. 5 shows a cross section on a longitudinal plane of section identified V-V in FIG. 3. In this particular instance, the length L1 of each external cavity 21 is equal to 150 mm and the length L2 of each internal cavity 22 is equal to 110 mm; the length Li of the connecting channels 23 is equal to 15 mm. In this FIG. 5 it can be seen that each internal cavity 22 is extended towards the tread surface 11 by a ripe 30. This then makes the tread easier to mould. Of course, provision could be made for the external cavities 21 to be extended into the thickness of the tread radially inwards to allow mould release radially from the inside with said tread then being attached to a tire that is in the process of being built.

Each internal cavity 22 has dimensions similar to those of the external cavities 21; the respective lengths L1 and L2 of the external and internal cavities are fairly similar in this instance. In order for the tread always to have groove or void elements present on its tread surface regardless of the degree of tread wear it is advantageous, as is the case here, for the internal cavities 22 of one same groove 2 to appear before the external cavities 21 have completely disappeared. Thus a first wearing layer I is formed extending between the tread surface in the new state and in the innermost points of the external cavities 21; a second layer II then extends down as far as the innermost points of the tread of the internal cavities 22. Of course, it is possible to plan for the second cavities to appear only after the first have completely disappeared through wear. It is also possible to provide a number of wearing layers higher than two (which is the example described with the support of FIGS. 3, 4, 5).

Through these measures it is possible to have, in the new state, an overall tread stiffness which is higher than would be the case for the same tread provided with the usual grooves each of which would have a total depth equal to the distance between the innermost points of the internal cavities and the tread surface in the new state. At least in the first phase of tread wear (which means down to a tread wear equal to 75% of the depth of the external cavities) the water pick-up and drainage function is performed by this groove because the water collected in the external cavities can flow into the connecting channels and the internal cavities. The water thus drained away can then re-emerge from another external cavity. Advantageously, the connections between the various cavities are suitable for not impeding the flow of fluid inside the groove.

When the first wearing layer I has completely worn away, the internal cavities 22 open over their entire length onto the new tread surface and can then act as reservoirs to store a greater or lesser proportion of the water present on the roadway in wet weather.

From a dimensional standpoint, the tread pattern S1 just described is defined as follows:

The tread pattern S1 comprises two wearing layers each having a groove height of 7 mm, and an overlap of 3 mm between the 2 layers (overlap meaning that a new groove or cavity in the next wearing layer appears before the groove or cavities of one wearing layer disappear);

This tread pattern S1 has a total voids volume Vc equal to 9% of a volume equal to the sum of the total volume V of material of the tread and of the total voids volume;

All the external cavities of the tread pattern S1 opening onto the tread surface in the initial state have a depth equal to 64% of the thickness of the tread;

Each wearing layer of this tread pattern S1 has an effective total voids volume Ve equal to 40 cm$^3$. This volume Ve, expressed in mm$^3$, satisfies the equation 0.4 St<Ve<0.8 St, the surface area St being expressed in mm$^2$. In this particular instance, a surface area St delimited by the external contour of the contact patch of the tread measured under static conditions under nominal load and pressure is measured, the tire being mounted on its recommended rim and this surface area is equal to 60300 mm$^2$ (so here, 24120<40000<48240).

For each continuous groove (2) comprising a plurality of external cavities (21) opening onto the tread surface in the new state and a plurality of internal cavities (22) positioned radially and entirely on the inside of the tread surface (11) in the new state, the total volume of the internal cavities is equal to 45% of the total volume of said groove in the new state. This total volume is equal to the sum of the volumes of the internal cavities, of the external cavities and of the connecting cavities.

In combination with the treads introduced hereinabove, various compounds denoted A0, A1 and referred to below have been tested. Compound A0 is the usual compound for the reference tread as marketed.

The tread referred to as A0/S0 (rubber compound A0 associated with tread pattern A0) is the reference combination used for comparison with the other combinations.

By extension, the tread referred to as An/Sm corresponds to a rubber compound An (with n=0.1) associated with the tread pattern Sm (with m=0 or 1).

To sum up, the compositions A0, A1 are described hereinbelow and in table 1:

A0 contains 40 phr of standard BR and 54 phr of N234 (CTAB=120 m$^2$/g).

A1 contains 75 phr of standard SBR of glass transition temperature Tg equal to –48° C. and 56.5 phr of N134 (CTAB=135 m$^2$/g).

TABLE 1

| Composition | A0 | A1 |
| --- | --- | --- |
| NR (1) | 60 | 15 |
| BR (2) | 40 | 10 |
| SBR (3) | | 75 |
| Carbon black N234 | 54 | |
| Carbon black N134 | | 56.5 |
| Paraffin | 1 | 1 |
| Antioxidant (5) | 2 | 2 |
| Stearic acid | 1.5 | 2 |
| ZnO | 3 | 3 |
| Sulphur | 1.1 | 1.1 |
| Accelerant (6) | 1.1 | 1.1 |

(1) NR: natural rubber (plasticized, peptized) (Tg = –65° C.)
(2) BR: polybutadiene with 2.5% 1,4-trans; 92.5% 1,4-cis; 5.0% of 1-2 (Tg = –105° C.)
(3) SBR Tin-coupled with high polydispersity index: styrene butadiene copolymer with the following contents by mass: 50% of 1,4-trans BR; 26% of 1,4-cis BR; 24% of 1,2 BR; 26.5% styrene (Tg = –48° C.). The molecular mass Mn of this polymer, determined using the SEC technique, is 145 000 g · mol$^{-1}$, the Ip is 1.7.
(5) N-1,3 dimethylbutyl N-phenylparaphenylenediamine (6-PPD)
(6) N-cyclohexyl-2-bensothiazylsulphenamide (CBS)

The composition of rubber compound A0 also contains 3 phr of a processability agent that is needed because it has been cut with elastomers and 0.5 phr of hardener and 0.25 phr of a curing resin.

The compositions of rubber compound A0, A1 are characterized by their breaking strength, measured by a uniaxial tensile test (method 1); the measurement is conducted by stretching to breaking point at 500 mm/min an H2 test specimen of rubber 2.5 mm thick; the extensometer used is of "Zwick" make (trade name). The deformation is monitored using an optical extensometer, measurements being taken at 60° C., in accordance with French standard NF T 40-101 (December 1979). The rubber material used to produce the test specimen is non-vulcanized and sampled prior to forming to create tread. This material is calendered and formed into a sheet 2.5 mm thick and is then cut to obtain a test specimen the longest length of which corresponds to the direction of calendering.

Another way to characterize the breakage properties is to take test specimen samples from the tire itself. The test specimen is 18 mm long, 1.1 mm wide and 0.3 mm in section. The test specimen from the tire is taken in such a way that the length of the test specimen runs parallel to the transverse direction of the tire (direction parallel to the axis of rotation of the tire). This test specimen is then stretched on an "Instron" (trade name) extensometer at 50 mm/min at 60° C. until it breaks. The deformation and stress at breakage are obtained on at least two test specimens.

The dynamic Tg is measured on a viscoanalyzer of trade name "Metravib" (model VA4000), in accordance with standard ASTM D 5992-96. The response of a sample of vulcanized compound (a cylindrical test specimen 4 mm tall by 400 mm$^2$ in section) subjected to simple alternating sinusoidal shear loading at the frequency of 10 Hz, under a stress of 0.7 MPa is recorded during a temperature sweep between −60° C. to +60° C. The location of the dynamic Tg is defined by the location of the maximum of tan δ (the ratio between the viscous and elastic moduli=G"/G').

The values for these characteristics are given in table 2.

TABLE 2

| Composition | A0 | A1 |
|---|---|---|
| Dynamic Tg 10 Hz | −50° C. | −30° C. |
| Breakage properties derived from method 1 | | |
| Elongation at break at 60° C. (in %) | 566 | 470 |
| Breaking stress at 60° C. (in MPa) | 20 | 19.4 |
| Breakage properties derived from method 2 | | |
| Elongation at break at 60° C. (in %) | 510 | 469 |
| Breaking stress 60° C. (in MPa) | 22.8 | 19.2 |

It is found that a combination of a tread pattern as described with a material the wear performance of which is very markedly improved over the reference material makes it possible to enhance the performance of the tire provided with this tread even though the tread material has an elongation at break of less than 500% elongation and may be sensitive to impact attacks. In the present combination, the tread pattern itself enables the tire to be desensitized to impacts.

Comparative Tests and Measurements on Tire

Braking Test:

the distance it takes for a vehicle using the tire to brake from a speed of 80 km/h to a speed of 20 km/h when driven on wetted bituminous concrete ground is measured.

For a tread pattern/composition combination considered, a value greater than the value expressed in base 100 for the reference combination A0/S0 indicates a reduction in the braking distance and therefore an improvement in the wet grip performance for the combination in question.

Impact Resistance Test:

a tread endurance test was carried out using the same (tread pattern/composition) combinations mounted on the front axle of a heavy goods vehicle of tractor type. The resistance of the tire tread was evaluated by a visual inspection of the treads thereof. In particular, the amount of material chunking and the size of these chunks was recorded. A score equal to 0 corresponds to an unsatisfactory performance, while a score equal to 100 corresponds to a satisfactory performance.

The results of these various tests are set out in table 3.

TABLE 3

| Composition | A0 | A0 | A1 | A1 |
|---|---|---|---|---|
| Tread pattern | S0 | S1 | S0 | S1 |
| Composition/tread pattern combination | A0/S0 | A0/S1 | A1/S0 | A1/S1 |

TABLE 3-continued

| Tire tests and measurement | | | | |
|---|---|---|---|---|
| Wet braking | 100 | 98 | 110 | 106 |
| Endurance test (impact resistance) | 100 | 100 | 0 | 100 |

It may be seen that the combination of tread pattern S1 with material A1 which is more sensitive to breakage than the material A0 allows an improvement in wet grip (use of a high content of SBR of Tg greater than that of natural rubber) without detriment to the resistance to chunking, despite a markedly downgraded elongation at break.

Of course, the invention is not restricted to the examples described and depicted and various modifications can be made thereto without departing from the scope defined by the claims. In particular, while the entire present description has been devoted to describing the application to a tire intended to be fitted to a heavy goods vehicle, it must be understood that a tread comprising a tread pattern and a composition such as those defined here also forms part of the invention because such a tread is intended to be incorporated into a tire (either at the time of tire building or when said tire is being retreaded).

It may be noted that, in general, tread patterns in which just part of the cavity volume is open onto the tread surface and, more precisely, is in contact with a roadway are advantageously used with the compounds described in this document for the tires according to the invention. Particular mention may be made of the tread patterns described in publications WO 2010/030276 or alternatively WO 02/38399. These tread patterns, while offering sufficient drainage in the contact patch, allow a high overall stiffness to be maintained by comparison with the conventional tread patterns while at the same time also making it possible to reduce the thickness of the tread.

It may also be noted that the tread pattern S1 used in combination with the compounds emerging from the invention may comprise grooves and voids oriented in directions other than the longitudinal direction (the circumferential direction on the tire). Thus, according to the destination on a heavy goods vehicle, the tread pattern comprises both longitudinal grooves and transverse grooves, it being possible for the latter type of groove to be of a type identical to those described in conjunction with FIGS. 3, 4, 5.

The invention claimed is:

1. Tread for a tire of a heavy goods vehicle having a tread surface intended to come into contact with a roadway, this tread having a total thickness E and a total volume V, this tread having:

at least two wearing layers I, II in the thickness of the tread, each layer having a thickness at most equal to 75% of the total thickness E of the tread, a total voids volume Vc at least equal to 7% and at most equal to 12% of a volume equal to the sum of the total volume V of the tread and of the total voids volume, at least one continuous groove comprising a plurality of external cavities opening onto the tread surface in the new state and a plurality of internal cavities positioned radially and entirely on the inside of the tread surface in the new state, the first wearing layer extending into the thickness of the tread as far as the radially innermost points of the external cavities, each other wearing layer extending into the depth of the tread as far as the innermost points of the internal cavities of the wearing layer in question, the external cavities having a mean depth P1 at most equal to 75% of the total thickness E of the tread, a mean length L1 and a cross section of area S1, the internal cavities having a mean height P2 at most equal to 75% of the thickness of the tread, a mean length L2 and a cross section of area S2, each internal cavity being connected to an external cavity by a connecting channel having two ends, said ends having cross sections of areas equal to the areas S1, S2 of the cross sections of the internal and external cavities connected by this connecting channel, this tread furthermore having an effective voids volume Ve for each wearing layer, this effective voids volume Ve contributing to draining the contact patch in which the tread is in contact with a roadway, which is less than the total voids volume Vc of the tread, this effective voids volume satisfying the following equation:

$$0.4\, St < Ve < 0.8\, St,$$

in which 0.4 and 0.8 are heights expressed in millimeters and St is the surface delimited by the external contour of the contact patch of the tread measured under static conditions under nominal load and pressure, the tyre being mounted on its recommended rim, wherein at least the first wearing layer I is made up of a rubber compound based on at least one material having a dynamic Tg—measured in accordance with standard ASTM D 5992-96, higher than −40° C. and predominantly containing an SBR copolymer of $Tg > -65°$ C.

2. Tread according to claim 1, wherein the rubber compound of the first wearing layer I has an elongation at break at 60° C. of less than 500%, this elongation being measured on the material sampled from the tread.

3. Tread according to claim 2, wherein the rubber compound of the first wearing layer I has an elongation at break at 60° C. of less than 400%, this elongation at break being measured on the material sampled from the tread in a direction parallel to the transverse direction of the tread.

4. Tread according to claim 1, wherein all the wearing layers I, II are made up of a rubber compound based on at least one material having a dynamic Tg—measured in accordance with standard ASTM D 5992-96, higher than −40° C. and predominantly containing an SBR copolymer of $Tg > -65°$ C.

5. Tread according to claim 4, wherein all the wearing layers I, II are made up of a rubber compound having an elongation at break at 60° C. of less than 500%, this elongation at break being measured on the material sampled from the tread in a direction parallel to the transverse direction of the tread.

6. Tread according to claim 1, wherein the rubber compound contains silica by way of reinforcing filler.

7. Tread according to claim 6, wherein the SBR copolymer of the rubber compound is functionalized with regard to the silica.

8. Tread according to claim 7, wherein these external cavities and internal cavities are such that the difference between the mean lengths of the internal cavities and of the external cavities is at most equal to 20% of the longest mean length (namely $0.80 \leq L1/L2 \leq 1.20$), the difference in the mean cross-sectional areas of the internal and external cavities is at most equal to 20% of the largest mean area (namely $0.80 \leq S1/S2 \leq 1.20$), and each external cavity of a continuous groove is connected to at least two internal cavities of the same groove by connecting channels which provide the continuity between said internal and external cavities.

9. Tread according to claim 8, wherein this tread further comprises a plurality of sipes opening onto the tread surface in the new state, each of said sipes connecting two consecutive external cavities of one same groove and at least two connecting channels and at least one internal cavity.

10. Tread according to claim 8, wherein for each continuous groove comprising a plurality of external cavities opening onto the tread surface in the new state and a plurality of internal cavities positioned radially and entirely on the inside of the tread surface in the new state, the total volume of the internal cavities is at least equal to 30% and at most equal to 60% of the total volume of said groove in the new state.

11. Tire for a heavy goods vehicle comprising at tread according to claim 8.

* * * * *